United States Patent Office 3,728,130
Patented Apr. 17, 1973

3,728,130
PASTA CONTAINING ETHOXYLATED MONOGLYCERIDES
Richard R. Egan, Worthington, Ohio, and Ira A. MacDonald, Prior Lake, Minn., assignors to Ashland Oil, Inc., Columbus, Ohio
No Drawing. Filed Feb. 19, 1971, Ser. No. 117,054
Int. Cl. A23l 1/16
U.S. Cl. 99—85     9 Claims

ABSTRACT OF THE DISCLOSURE

Pasta is prepared by forming and drying a pasta dough comprising flour, liquid and ethoxylated monoglycerides. The ethoxylated monoglycerides tend to improve the machinability of the dough and decrease the stickiness of the pasta during drying and the resulting pasta is firmer after cooking than pastas not containing ethoxylated monoglycerides.

BACKGROUND OF THE INVENTION

Pastas (sometimes referred to as alimentary pastes) are staple articles of commerce. They are prepared by forming a dough from a mixture of flour and liquid (usually water or milk), sometimes with other added ingredients, extruding the resulting dough under pressure into the desired product shape, and then drying the extruded product under controlled conditions.

The flour used to form pastas is generally a high quality, durum wheat known as semolina although other flours may be used (e.g. farina, durum flour, etc.).

When pastas are prepared for human consumption, they are cooked in boiling water, separated from the water, and then kept warm until served.

U.S. Pat. 3,113,869 describes the tendency of alimentary paste products (i.e. pastas) to become pasty or sticky *after* being cooked. That patent teaches that the post-cooking stickiness can be reduced by incorporating highly distilled monoglycerides into the products before use. However, distilled monoglycerides are inconvenient to use because they are normally solid at room temperature, they do not disperse readily in water, and they are relatively expensive. Even so, distilled monoglycerides are used at the present time in quality pastas.

In addition to their concern over the tendency for cooked pastas to become sticky or pasty, those engaged in the manufacture and use of pastas are concerned about ways of improving the machinability of the pasta doughs during extrusion, decreasing the stickiness of the extruded doughs during drying, improving color and water absorption, and making somewhat softer pastas that are appropriately brittle without being excessively fragile.

SUMMARY OF THE INVENTION

It has now been discovered that certain ethoxylated monoglycerides can be used as intentional food additives in the preparation of pastas with desirable results.

The use of ethoxylated monoglycerides in pastas tends to improve the machinability of pasta doughs during extrusion, tends to decrease the stickiness of the extruded product during drying, tends to produce finished pastas that are dryer and yet softer on compression, and improves color and water absorption. Unexpectedly, the resulting pastas are firmer after cooking than pastas made without this intentional food additive. The tendency to disintegrate or "overcook" is reduced when compared to products containing distilled monoglycerides (90%). Although this intentional food additive can be used to replace distilled monoglycerides, if this food additive is used in conjunction with distilled monoglycerides, this additive aids in dispersing the distilled monoglyceride in water or milk prior to forming the pasta dough. This food additive is significantly cheaper than distilled (90%) monoglycerides.

DETAILED DISCUSSION

Pasta doughs and use of the food additives therein

Pasta doughs are prepared by mixing a suitable flour or mixture of flours with water or other liquid (e.g. milk) and various optional ingredients (e.g. eggs are used in making noodles) and then blending and kneading the resulting ingredients. Selection of suitable flours and supplemental ingredients, together with the selection of the appropriate amount of water, are all acts within the skill of the art and this invention is not critically dependent upon the selection of any particular recipe. The invention can be used in the preparation of all pastas including macaroni and noodle products such as spaghetti, vermicelli, milk and soy macaroni, and egg noodles. The invention is particularly useful when applied to the manufacture of spaghetti.

The ethoxylated monoglycerides of the present invention are desirably dispersed in the water or other liquid prior to mixing the water and flour together to form the pasta dough. It is possible to use the ethoxylated monoglyceride food additive of the present invention alone or in combination with other known food additives including distilled monoglycerides. When, for example, the ethoxylated monoglycerides of the present invention are used in combination with distilled monoglycerides, the ethoxylated monoglycerides serve the useful function of assisting in forming a good dispersion of the distilled monoglycerides in water.

Although the amount of ethoxylated monoglyceride used to the practice of the present invention can vary widely, the amount will generally fall within the range of 0.1–2%, more usually from 0.25–1.75% (e.g. 0.5–1.5%), bsaed upon the weight of the flour used to prepare the pasta dough. With the specific ethoxylated monoglyceride described in Example I hereof, optimum results appear to occur at about 1% of the ethoxylated monoglyceride based upon the weight of the flour used to form the pasta dough.

The food additives

The food additives of this invention are prepared by the condensation of from 5–50 moles of ethylene oxide, preferably 10–30 moles of ethylene oxide (e.g. 20 moles of ethylene oxide) per mole of crude or partially refined monoglyceride containing at least 10% alpha monoglyceride and more preferably 20–40% alpha monoglyceride (e.g. 25% alpha monoglyceride). For purposes of making such calculations, it is convenient to assume that the crude or partially refined monoglyceride has an average molecular weight of about 535. The condensation products typically range in appearance from pale yellow liquids to white pasty semi-solids. This is in sharp contrast to the distilled monoglycerides of commerce which are hard solids at room temperature.

Since the crude or partially refined monoglycerides used in the practice of the present invention are mixtures of alpha and beta monoglycerides with diglycerides, triglycerides and/or free glycerine calculation of the number of moles of ethylene oxide which have been condensed per mole of crude monoglyceride is not always a satisfactory method of characterizing the food additives of the present invention. More meaningful information is obtained if one records or notes both: (1) the percent alpha or percent total monoglyceride present in the crude or partially refined monoglyceride; and (2) the percent by weight of ethylene oxide (on an anhydrous basis) present in the ethoxylated monoglyceride (i.e. based on the total weight of the complex condensate). Typically, the condensates will contain from 10–95% by weight of ethylene oxide based on 100 parts by weight of the complex ethoxylated monoglyceride. More commonly, the food additives of the present invention will contain from 25–80 weight percent (e.g. 45–75 weight percent) of ethylene oxide on the same basis.

The acid portions of the crude monoglycerides will correspond to the fatty acid radicals common to the animal or vegetable source of the crude or partially refined monoglyceride. Typically, these fatty acid radicals will each contain from 10–24 (e.g. 14–18) carbon atoms. For many applications it is preferred that these fatty radicals be saturated. The high degree of saturation will ordinarily be reflected by an iodine value for the non-ethoxylated crude or refined monoglyceride of less than 10 and preferably less than 5 (e.g. less than 2).

The preparation of ethoxylated monoglycerides for use in the practice of the present invention begins with the preparation of an edible monoglyceride. This monoglyceride will typically contain mono, di-, and triglycerides and can be used as is (i.e. crude) or can be refined (e.g. as by distilling) to increase the monoglycerides content. Desirably, the crude or partially refined monoglyceride will contain 20–30% alpha monoglycerides. Crude monoglycerides can be prepared by the direct esterification of glycerine with fatty acids or by the glycerolysis of fully hydrogenated edible fats (e.g. having the low iodine values as previously indicated for the crude and refined monoglycerides). Both of these reactions are well known in the art and crude and refined monoglycerides of varying alpha monoglyceride contents are staple articles of commerce at the present time. Crude monoglycerides (e.g. 20–30% alpha monoglyceride) are preferred over the highly refined monoglycerides (e.g. 90% alpha monoglycerides). In this connection it has been found that when crude or partially refined monoglycerides containing above about 60% alpha monoglycerides or above about 70% total monoglycerides are used (the two figures are comparable), extra processing is required and the preparation of these food additives becomes uneconomical. Furthermore, there do not appear to be any performance advantages (in food) associated with the use of high purity (e.g. substantially 100% pure) monoglycerides as a raw material in the preparation of the ethoxylated food additives.

The reaction between the crude or refined monoglycerides and ethylene oxide can be conducted under condensation conditions of the type heretofore used to prepare the condensation products of ethylene oxide with, for example, sorbitan monostearate. Thus, ethylene oxide and a crude or partially refined monoglyceride can be condensed by heating them together in the presence of a suitable condensation catalyst (e.g. potassium hydroxide) at temperatures of from 320°–350° F. at pressure of 20–150 p.s.i.g.

After the intentional food additives of the present invention have been prepared, they will be used in the preparation of pasta doughs as hereinbefore described.

The present invention is further illustrated by the following specific examples that include a preferred embodiment. Unless otherwise indicated, all parts and percentages are by weight.

EXAMPLE I

This example illustrates the preparation of a crude monoglyceride by the glycerolysis (Step I) of a fatty triglyceride and the subsequent condensation (Step II) of ethylene oxide with the crude monoglyceride of Step I to form an ethoxylated monoglyceride useful in the practice of the present invention.

Step I (preparation of a crude monoglyceride)

Ninety parts of fatty triglyceride (hydrogenated tallow) having an iodine value of less than 5 are placed in a reaction vessel and melted. Meanwhile, 0.3 part of potassium hydroxide (100% basis) is dissolved in 10 parts of glycerine. The resulting glycerine/KOH mixture is then poured into the reaction vessel and mixed with the melted triglyceride. The resulting reaction mixture is then heated with agitation to a reaction temperature of 320°–340° F. Agitation is continued and the reaction mixture is sparged with nitrogen. The reaction is continued for 8–10 hours at which time the contents of the reaction vessel are cooled and recovered. The recovered product is a crude monoglyceride containing approximately 25% alpha monoglycerides, 2.5% unreacted glycerine, with the balance being beta monoglycerides, diglycerides and triglycerides. This crude monoglyceride (a mixture) will typically have an acid number less than 1, a saponification number of approximately 170–175, an average molecular weight of 520–550 (e.g. 535), and be a clear, pale liquid at 140° F.

A hydrogenated fatty triglyceride which can be used in the foregoing reaction is an edible grade of hydrogenated tallow having an iodine value of less than 2, an acid value of less than 2, a saponification value of 190–200, a titer of 55°–62° C., and an average molecular weight of 850–875. The fatty acid radicals present in such a hydrogenated tallow are typically 4% myristic acid (a $C_{14}$ acid), 31% palmitic acid (a $C_{16}$ acid) and 65% stearic acid (a $C_{18}$ acid).

Step II (preparation of an ethoxylated monoglyceride)

Five hundred thirty-five parts (i.e. one mole) of the crude monoglyceride of Step I are added to a reaction vessel which is closed, heated to 320°–340° F. and held at that temperature. The monoglyceride is then agitated and the reaction vessel is thoroughly swept with dry nitrogen to remove all traces of water and oxygen. This step is repeated. The reaction vessel is then closed and nitrogen pressure is allowed to build up to 5 p.s.i.g. Next, the addition of 880 parts (i.e. 20 moles) of ethylene oxide is begun. The reaction between the ethylene oxide and crude monoglyceride begins instantly. It is catalyzed by the potassium hydroxide from Step I which was not removed from the crude monoglyceride. The pressure in the reaction vessel is allowed to rise to 40–60 p.s.i.g. and is maintained at this level throughout the remainder of the reaction. The pressure is controlled by manipulating the addition rate of ethylene oxide. The temperature range is controlled at 340°–380° F. by a cooling coil which is used intermittently, as needed. When all of the ethylene oxide is added and reacted, the pressure will drop rapidly. Total reaction time for ethoxylation is 8–10 hours. The reaction mixture is then cooled until the pressure in the reaction vessel has been reduced to 5 p.s.i.g. The reaction vessel is then vented to the atmosphere and opened. The residual potassium hydroxide is neutralized with 3.3 parts of 85% aqueous phosphoric acid. 2.3 parts of activated charcoal are then added to the reaction mixture with agitation. The reaction product is then filtered to remove the activated charcoal. The filtrate is an ethoxylated monoglyceride (a 20 mole adduct) and wil contain from 60–65% ethylene oxide (in condensed form) as reported on an anhydrous basis. Ordinarily, the hydroxyl value will be between 65–80 and the saponification value will be 65–75. Usually, the acid value will be less than 2.

The standard test methods found in Food Chemicals Codex, 1st edition, 1966 can be used for determining acid value and the like.

EXAMPLES II–V

These examples illustrate the use of the present invention in the manufacture of spaghetti.

In these examples, the flour used was a high quality granular durum semolina of 14.0% moisture, 0.703 ash, 12.95% protein, and a granulation of 100% through U.S. No. 20 sieve and 2% through U.S. No. 100 sieve. In each example, eight pounds of semolina flour and 910 ml. of water (at 120° F.) containing the food additive were blended together at a rate of 227 grams per minute of flour and 57 ml. of water per minute. The blended products were then mixed for five minutes under a 13.5 p.s.i.g.

vacuum. The resulting doughs were extruded from a spaghetti press at 1500 p.s.i.g. and dried in an environmental dryer programmed for 21 hours drying time at a dry bulb temperature of 108° F. and a wet bulb temperature ranging between 108° F. and 98° F.

For purposes of comparison, the procedure was repeated using plain water (herein referred to as the "control").

In each of the examples, an ethoxylated monoglyceride substantially identical to that of Example I was dispersed in the water and the aqueous dispersion used in preparing the pasta dough.

In Example II, 0.25% of ethoxylated monoglyceride was used based on the weight of flour. In Example III, the amount of ethoxylated monoglyceride was 0.5% on the same basis. In Examples IV and V, the amounts of ethoxylated monoglyceride were 1.0% and 2% respectively.

When the resulting products were compared with the control visually and physically, both before and after cooking, the following results were noted.

Increasing the concentration of ethoxylated monoglyceride did not have any noticeable color change effect on the spaghetti until the 2% level was reached (Example V). However, at the 2% ethoxylated monoglyceride level, the bright yellow color characteristic of the control and Examples II-IV was lost.

Increasing the concentration of ethoxylated monoglyceride increased the softness of the dried spaghetti.

Machinability during extrusion seemed to be enhanced.

Based on the comparison of various factors tested, it appeared that the optimum level of ethoxylated monoglyceride was about 1% based on the weight of flour.

EXAMPLE VI

Although distilled monoglycerides are known to have a desirable effect on pastas when used as an intentional food additive, they have the disadvantage (among others) of causing spaghetti to be considerably whiter than spaghetti that does not contain any such additive (such spaghetti has a characteristic bright yellow color).

For purposes of comparison, spaghetti, was made using 1 weight percent of ethoxylated monoglyceride (Starfol-D, a product of Ashland Chemical Co.). Two control samples of spaghetti were also prepared in the identical manner except that one control was free of adidtives and one control contained 1 weight percent distilled monoglyceride (GMS-900). The percentages were based on flour weight.

The colors of the resulting products (uncooked) were compared using a Gardner color difference meter (see Walsh, Measurement of Spaghetti Color, The Macaroni Journal, August 1970, pp. 20–22). The following results were obtained.

|  | Yellowness "b" value |
|---|---|
| No additives | +20.9 |
| 1% distilled mono | +15.9 |
| 1% ethoxylated mono | +21.3 |

These results demonstrate the advantage (in terms of color) of using ethoxylated monoglycerides instead of distilled monoglycerides.

EXAMPLE VII

In this example, spaghetti was made using 1% ethoxylated monoglyceride (Starfol-D) based on flour weight. For purposes of comparison, spaghetti was made in the same way using 1% distilled monoglyceride (GMS-900) instead of the ethoxylated monoglyceride.

Cooking tests were then conducted by heating ten grams of spaghetti in 300 ml. of vigorously boiling water. At various time intervals, the samples were removed, drained and weighed. After weighing, the samples were then dried and re-weighed to determine how much of the original ten gram portion had been lost by disintegration, etc.

The results are shown below.

COOKING TESTS

| Distilled mono-glyceride | Ethoxylated mono-glyceride | 10 minutes | | 20 minutes | | 30 minutes | | 40 minutes | | 50 minutes | |
|---|---|---|---|---|---|---|---|---|---|---|---|
| | | Cooked weight (gm.) | Cooking loss (percent) | Cooked weight (gm.) | Cooking loss (gm.) | Cooked weight (percent) | Cooking loss (gm.) | Cooked weight (gm.) | Cooking loss (percent) | Cooked weight (gm.) | Cooking loss (percent) |
| 1.00 | | 26.1 | 6.3 | 33.1 | 8.7 | 37.1 | 9.7 | 40.7 | 10.3 | 42.4 | 14.5 |
| | 1.00 | 25.6 | 6.5 | 33.2 | 8.2 | 38.2 | 9.8 | 41.8 | 11.9 | 47.2 | 13.0 |

What is claimed is:

1. In the process of preparing pasta wherein flour and liquid are mixed to form a pasta dough which is thereafter shaped and dried, the improvement which comprises incorporating an additive into said pasta dough, said additive consisting essentially of the condensation product of from 10 to 95 parts by weight ethylene oxide with correspondingly from 90 to 5 parts by weight of mixed $C_{10}$–$C_{24}$ fatty acid ester of glycerine, said mixed ester having at least a 10 wt. percent monoglyceride with diglycerides, triglycerides and glycerine constituting the balance of said mixed ester.

2. The improvement in accordance with claim 1 wherein said additive consists essentially of the condensation product of from 45–75 parts by weight ethylene oxide with correspondingly from 55–25 parts by weight of a mixed $C_{14}$–$C_{18}$ fatty acid ester of glycerine, said mixed ester having 20–30 weight percent monoglyceride content with diglycerides, triglycerides and glycerine constituting the balance of said mixed ester.

3. The improvement in accordance with claim 2, wherein the amount of said additive is from 0.25–1.75% of the weight of flour used to make said dough.

4. The improvement in accordance with claim 3 wherein said pasta is spaghetti and wherein said additive is mixed with water prior to being mixed with said flour.

5. The improvement in accordance with claim 4 wherein said spaghetti includes a distilled monoglyceride as a supplemental additive.

6. A pasta having incorporated therein an additive consisting essentially of the condensation product of from 10 to 95 parts by weight ethylene oxide with correspondingly from 90 to 5 parts by weight of mixed $C_{10}$–$C_{24}$ fatty acid ester of glycerine, said mixed ester having at least a 10 weight percent monoglyceride content with diglycerides, triglycerides and glycerine constituting the balance of said mixed ester.

7. A pasta in accordance with claim 6 wherein said pasta is a macaroni product and wherein said food additive consists essentially of the condensation product of from 45–75 parts by weight ethylene oxide with correspondingly from 55–25 parts by weight of a mixed $C_{14}$–$C_{18}$ fatty acid ester of glycerine, said mixed ester having 20–30 weight percent monoglyceride content with diglycerides, triglycerides and glycerine constituting the balance of said mixed ester.

8. A macaroni product in accordance with claim 2 wherein the total amount of said additive is from 0.5–1.5% of the weight of the flour in said pasta.

9. A macaroni product in accordance with claim 8 which includes a distilled monoglyceride as a supplemental additive.

References Cited

UNITED STATES PATENTS 3,113,869  12/1963  Lee _____ 99—85
3,433,645   3/1969  Egan et al. _____ 99—91 X A. LOUIS MONACELL, Primary Examiner J. R. HOFFMAN, Assistant Examiner